United States Patent [19]

Sowards et al.

[11] 3,905,775

[45] Sept. 16, 1975

[54] MODULE

[75] Inventors: Donald Maurice Sowards, Claymont; Richard N. Watson, Wilmington, both of Del.

[73] Assignee: E. I. Du Pont de Nemours and Company, Wilmington, Del.

[22] Filed: Dec. 12, 1972

[21] Appl. No.: 314,328

[52] U.S. Cl. ............ 23/288 FC; 138/108; 138/143; 138/177; 23/288 R; 252/477 R
[51] Int. Cl.² .......................... B01J 8/00; F16L 9/14
[58] Field of Search ........ 23/288 F, 288 FC, 288 R; 60/295; 252/477 R; 138/108, 111, 112, 143, 177

[56] References Cited
UNITED STATES PATENTS

| | | | |
|---|---|---|---|
| 3,172,251 | 3/1965 | Johnson | 23/288 F X |
| 3,362,783 | 1/1968 | Leak | 23/288 F |
| 3,441,381 | 4/1969 | Keith et al. | 23/288 F |
| 3,507,627 | 4/1970 | Frant et al. | 23/288 F |
| 3,561,494 | 2/1971 | Hackett | 138/177 |
| 3,568,723 | 3/1971 | Sowards | 138/111 |
| 3,692,497 | 9/1972 | Keith et al. | 23/288 F |
| 3,771,967 | 11/1973 | Nowak | 23/288 F |
| 3,798,006 | 3/1974 | Balluff | 23/288 F |

*Primary Examiner*—Barry S. Richman
*Assistant Examiner*—Arnold Turk

[57] ABSTRACT

A module is provided which comprises a casing having an inlet and outlet face and a transition refractory material anchored in the casing which surrounds and contains a monolith or monoliths having longitudinal and transverse axes, which monolith or monoliths provide an unobstructed flow path between the inlet and outlet faces of the casing, the lowest compressive strength of the monolith measured perpendicular to a longitudinal axis being greater than the compressive strength of the transition refractory material.

13 Claims, 4 Drawing Figures

PATENTED SEP 16 1975  3,905,775

MODULE

BACKGROUND OF THE INVENTION

In the treatment of fluids generally and automotive exhaust emissions particularly, it has been proposed that a catalytically active ceramic element be used. In order to be effective, such element must somehow be mounted in the path of the fluid flow. In the treatment of automotive emissions, for example, several different types of mechanical arrangements have been proposed through which exhaust gases would be channeled. Such mechanical expedients complete the combustion of partially oxidized fuel components, mostly carbon monoxide and hydrocarbons, which are to a great extent responsible for the obnoxious effect of automotive exhaust emissions. These devices are also useful to catalytically remove any nitrogen oxides formed in the combustin process.

Such mechanical contrivances are disclosed, for example, in U.S. Pat. Nos. 3,441,381 and 3,441,382. In those cases, a ceramic catalyst in the form of a monolith is put into a "can" which is part of a metal system mounted to the exhaust system of an internal combustion engine by pipes at either end. The exhaust emissions are thus channeled into the presence of a catalyst with which they interact. Such assemblages have been difficult, if not impossible, to manufacture uniformly on a production line basis, since the catalytically active ceramic element is extremely fragile and can be destroyed rather readily. Ceramic blocks or plugs which have been used to anchor the ceramic catalyst within the "can" have been found generally to press with appreciable force against the top, bottom and side faces of the porous unitary support, thus causing one or more of its faces to become crushed, cracked, spalled or deformed at the support marginal edge portions adjacent to the blocks or plugs. At times, the blocks or plugs have even become embedded in the flow passages of the ceramic face of the support.

Several different ways to provide resilient packing between the catalyst coated monolith and the container to simultaneously physically fix the ceramic element in position and reduce or obviate the deleterious interaction between the monolith and the container have been proposed. While some packaging expedients have been found to be good functionally, they nevertheless suffer from a deficiency in strength. On the other hand, differences in coefficients of expansion between the ceramic element, the container in which it is disposed and/or the packing material cause spaces to form after repeated heating and cooling. When spaces form, the catalyst begins to rattle about and ultimately deteriorates and becomes destroyed. Even in those cases in which the resilience of the packing material allows it to deform to absorb the changes due to the differences in coefficients of expansion, the effort and time consumed in preparing the construction renders the utilization of such an alternative commercially unfeasible.

SUMMARY OF THE INVENTION

The foregoing disadvantages can be substantially obviated in accordance with this invention by simply inserting or otherwise disposing or placing one or more modules of this invention into an apparatus such as those described in the prior art for the treatment of fluids generally and automobile exhaust gases in particular. The module comprises a casing having an inlet and an outlet face and a transition refractory material anchored in the casing which surrounds and contains one or more monoliths, each of which has longitudinal and transverse axes, which monolith or monoliths provide unobstructed flow between the inlet and the outlet faces of the casing of the module, the lowest compressive strength of the monolith measured perpendicular to a longitudinal axis thereof being greater than the compressive strength of the transition refractory material. The casing or housing of the module is preferably rigid, most preferably metal.

DETAILED DESCRIPTION OF THE INVENTION

The various embodiments of this invention can be more readily understood by reference to the accompanying drawings in which like figures represent like constituents in each of the different views.

Briefly, FIG. 1 is a perspective view of one type of metal casing contemplated within the scope of this invention.

Figure 1:
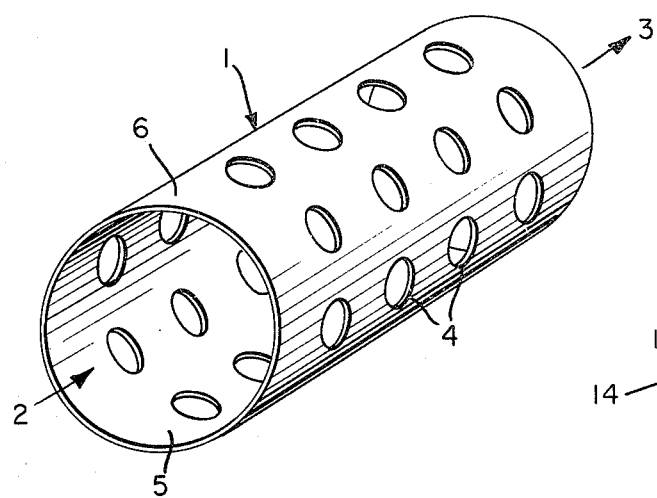

With more specific reference to the drawings and the embodiments of this invention, FIG. 1 represents a type of casing having an interior surface 5 and an exterior surface 6 which may be used in the construction of the module of this invention. While FIG. 1 represents the casing as being substantially cylindrical in configuration, it is to be understood that an ovoid, eliptical, square or other geometric configuration may also be employed with equal advantage providing that the casing has an inlet face 2 and an outlet face 3 through which fluid can enter and exit.

Further, while the illustrated casing contains a large number of round holes 4, which in one embodiment of this invention are used as anchoring points in which the transition refractory material secures itself on one side while securing the monolith on the other, the invention is not limited to such an embodiment. Indeed, the casing may contain any number of slots or apertures of any kind or configuration which could serve as anchoring points for the transition refractory material. The casing may also be made of lath wire or wire mesh if desired. On the other hand, the casing can be completely integral if desired and without apertures of any kind. In such a case, the casing may contain indentations or have an irregular or textured inner surface or it may have nodules on its interior surface or otherwise be affixed with any other mechanical means to which the transition refractory material can secure itself and ultimately the monolith.

It should be understood that a critical aspect of the casing is that it contains some physical or mechanical means to which the transition refractory material can be anchored. Mechanical anchoring means are necessitated by the fact that simple adhesion between the transition refractory material and the interior of the metal casing is inadequate since differences in coefficients of expansion between the refractory anchoring and securing means and the casing will eventually cause any adherent bond to be weakened and possibly even torn loose.

While any suitable material can be used in constructing the casing it must be kept in mind in making a choice that as long as the integrity of the tube or casing is preserved, the integrity of the whole construction will be maintained. In any event, the ability of the construction or module of this invention to withstand the rigors involved in the treatment of fluids is primarily dependent upon the strength of the exterior housing or casing of the module since the entire construction of this invention is placed whole into the apparatus or container through which the fluid which is to be treated is allowed to flow. While it is preferred that the casing or housing comprises the outermost layer or exterior of the module, in one embodiment of this invention illustrated in FIG. 4, the casing may also be embedded in the transition refractory material 21 in addition to surrounding it. In such an embodiment, the transistion refractory material surrounds the exterior surface of the casing as well as the interior surface of the casing. In this variation of the invention lath wire or wire mesh is particularly useful as the casing material from an economic standpoint although any of the other types of casings or housings described herein may also be used.

The exterior casing or housing may be fabricated from any substance or material which is capable of withstanding the conditions of temperature, pressure and degradation to which it will be exposed in the treatment of a fluid or any other material with respect to the treatment of which the module of this invention is to be employed. Even expanded materials having a high tensile and compressive strength may be used in which case it would be a simple matter to anchor the transition refractory material into the interior cellular structure of the expanded exterior casing or imbed the casing in the outer layer of the transition refractory material. Any expanded material which is sufficiently strong to protect the ceramic unitary element or monolith and which is sufficiently compatible with the fluid stream to be treated to retain its integrity at the temperature and pressures involved in the treatment of the fluid stream may be used. Some such materials include a foamed or porous metal such as any of those described below in foamed or porous form or any foamed or porous natural or synthetic material posessing sufficient rigidity and resistance to mechanical stress to enable it to protect the interior structure.

Generally, the casing or housing may be prepared from any natural or synthetic substance that will accommodate the differential mechanical stresses generated in a use condition. Some such suitable materials include, for example, stainless steel, chromium, nickel, copper, iron, aluminum, aluminized steel, galvanized steel and any alloys or combinations thereof and the like. The specific substance to be employed is determined by the conditions to which the module is to be exposed. Most preferably, metals of construction for handling gases are employed. Stainless steel is most preferred, since it appears to retain its integrity without degradation and its interaction with a fluid atmosphere is usually not deleterious, either to itself or the fluid.

Figure 2:
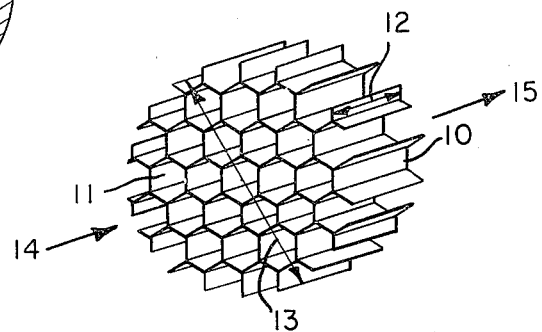
FIG. 2 is a perspective view of a ceramic unitary element or monolith.

FIG. 2 illustrates one type of monolith or ceramic unitary element 10 of this invention. The monolith 10 has a longitudinal axis 12, a transverse axis 13, an inlet face 14 and an outlet face 15. While the unitary inert refractory support depicted contains a continuous skeletal structure, the interconnected walls or elements of which are in the shape of a honeycomb 11, it is to be understood that the configuration or structure of the support is immaterial and that it can be oriented or unoriented. In this regard, the monolith can be in the form of a honeycomb with cells of various sizes or it may contain cells that criss-cross or intersect. The monolith can also be in the form of a rigid open-celled foam or a rigid structure formed by bonding fibers together in a matt. The method of manufacture is unimportant; for example, a suitable honeycomb for preparing the module of this invention may be formed by stacking or rolling corrugated sheets, by extrusion or by perforation of solid blocks of material.

While the transverse axis 13 is much longer than the longitudinal axis 12 in the monolith of FIG. 2, it is to be understood that the monolith of FIG. 2, it is to be understood that the monolith can also have a longitudinal axis 12 which is longer than the transverse axis 13. Further, the exterior casing may contain a series of monoliths or ceramic unitary elements 10 packed solidly or with spacings interspersed therebetween to occupy substantially all of the casing interior. Alternatively, the casing may contain only one monolith construction 10 which occupies essentially all of the interior space of the casing. In another modification, the monoliths may occupy less than all of the interior space of the casing as desired. In such a case the unfilled extensions of the casing may be used to space the module or modules or they may be used as fastening points at which the module is secured in place.

Particularly preferred as support materials to be coated with a catalyst for the treatment of fluids in the preparation of monolith 10, are thin wall refractory ceramic structures which are made by methods generally known in the prior art. Such structures generally have a predetermined orderly shape and are made up of ceramic sections ranging in thickness of from about 1 mil up to about 260 mils or more. Some such suitable materials are generally marketed and may easily be purchased from a variety of manufacturers, such as for example, Corning Glass Co., American Lava Corp., Hexcel Corp., Ugine Industries, Plessey, Ltd. and Du Pont.

In preparing the modules of this invention, it is particularly preferred that the ceramic support have a honeycomb structure. While the honeycomb structure may be fabricated by corrugating sheets of aluminum coated with fluxing agent and placing the coated sheets together node to node and then firing to form the ceramic structure, any other suitable method such as, for example, the method described in U.S. Pat. No. 3,255,027 issued to H. Talsma on June 7, 1966, as well as the improvements described in U.S. application Ser. No. 367,856, filed May 15, 1964 and now abandoned; U.S. application Ser. No. 471,738, filed July 13, 1965; U.S. application Ser. No. 449,629, filed Apr. 20, 1965 and now abandoned, and U.S. Pat. No. 3,338,995, and the structures described therein may also be employed. Other methods and products obtained thereby which may be employed in the production of the monolith of this invention are disclosed for example, in U.S. Pat. Nos. 3,112,184; 2,674,295; 2,610,934; 2,734,843; British Pat. No. 931,096 published July 10, 1963 and the like.

While any such desired monoliths may be employed, it is preferred that the texture of the side surface or exterior longitudinal surface of the monolith is either porous or has a certain definite texture thereto. This porosity or texture allows for a physical interlock to form between the monolith and the transition refractory material or cement. If the monolith does not have a textured or porous side surface, a texture can be imparted by merely abrading the surface so that an adequate physical interlock can be formed. Alternatively, a transition refractory material or cement can be chosen which has sufficient adherency to permit it to support the monolith by an adherent bond, notwithstanding the absence of a physical interlock. In such a case the relationship between the compressive strength of the monolith or monoliths and the compressive strength of the adherency cement must still be observed.

The monolith discussed in the foregoing as well as the cited references may function alone, somewhat in the manner of a filter, or it can be coated or impregnated with a catalyst or any other material to be used in the treatment in which the module of this invention is to be employed. Any of the techniques discussed in the references cited herein may be used for the coating or impregnation of the monolithic support. For example, the ceramic support can be impregnated by immersion in a solution and then treated with a reducing agent or it can be impregnated, dried and calcined to oxidize or decompose the material deposited on the surface thereof. The basic support structure can be immersed in a solution, dispersion or slurry of a catalyst or other material or the catalyst or other material can be sprayed or brushed onto the surface. Any suitable catalytic material such as for example all of the solid inorganic materials commonly used as such may be thus applied. Some such suitable materials include, for example, the oxides, cerates, chromates, chromites, manganates, manganites, molybdates, tungstates, carbonates, stannates, ferrites and vanadates of such metals as iron, cobalt, nickel, zinc, palladium, platinum, ruthenium, rhodium, manganese, chromium, copper, cadmium, silver, calcium, barium, mercury, tin, lead, molybdenum, tungsten and the rare earths. The precious metals such as ruthenium, rhodium, palladium and platinum can also be used in elemental form. Other catalysts and materials such as for example, catalyst promoters and/or fluxing agents can also be used, as discussed in any of the references cited hereinbefore, as well as in U.S. Pat. Nos. 2,823,235; 3,216,954; 2,866,515 and 2,491,695 and any suitable means of application or coating onto the support as discussed above and in U.S. Pat. Nos. 3,518,206 and 3,554,929 and the like may be employed. The particular catalyst or agent applied to the support does not alter or affect the mechanical operability of the module of this invention as long as it does not interfere with the bond between the refractory cement and the monolith or monoliths. If some likelihood exists that the caatalyst or agent applied to the support might interfere with the achievement of an adequate bond, the modular construction can be formed first and subsequently treated to apply a catalyst or other agent to the monolith.

Figure 3:
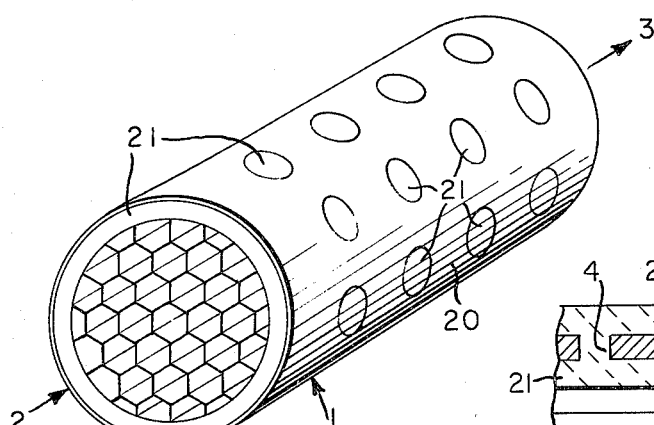
FIG. 3 is a perspective view of a complete unitary physical structure or module of this invention.

In preparing the module or cartridge of this invention, an example of which is depicted in FIG. 3, the monolith which may be coated with a catalyst is anchored or supported within the casing or housing 1 by means of a transition refractory material 21. The transition refractory material 21 is a conjunctive cement which anchors, surrounds and contains the monolith within the exterior casing. The conjunctive refractory 21 also occupies the space between the monolith and the exterior casing in order to permit it to act as a transition material and protect the monolith from being crushed and deteriorated. Generally, the cement occupies a space of from about ½ to 10 times the thickness of the metal casing.

Any of the refractory cements which are air or thermally set are preferred. Porous as opposed to dense, solid cements are also preferred and those having a typical porosity of 10 to 50 percent are most preferred.

The refractory cements must have dimensional stability in order to operate adequately under treatment conditions. Furthermore, the refractory cements must admit of placement, usually at atmospheric temperatures, and the development of sufficient strength to hold the members which it joins and maintain them in position notwithstanding the conditions of temperature, pressure and degradation to which it will be exposed in the treatment.

The refractory may be based on soluble silicates and may be prepared from sodium and/or potassium silicate solutions, colloidal silica, lithium polysilicate and the like, and mixtures thereof. Sodium and/or potassium silicate based cements are preferred. As an illustration, for monoliths with low compressive strength an inorganic binder is made by dispersing colloidal silica, acidifying to a pH of 3.5 and adding an aluminum salt such as an aluminum formate. Alternatively, a mixture of colloidal silica and polyvinyl alcohol may be used as a binder. In either case, it is desirable to render the colloidal silica attractive to an inorganic refractory powder or fibrous material added to the formulation in the production of a bulky cement by incorporating positively charged starch into it, thus providing an improved bonding mixture for aluminum silicate.

Colloidal silica is especially advantageous since it helps to develop dry strength through the gelling action of silica and forms stronger bonds at comparatively lower temperatures because of its chemical reactivity. Controlled bond strength in the refractory cement is also obtainable using mixtures of monoaluminum phosphate in colloidal silica. When used with finely divided refractory powders of zircon, zirconia or alumina, the reaction of $P_2O_5$ with silica at relatively low temperatures develops high bond strength in the refractory composition. Accordingly, a silica sol may be mixed with ammonium phosphate or other $P_2O_5$ precursors at a relatively low pH and used in minimal quantities as a binder in the refractory body. These and other suitable compositions which may be used in the fabrication of the transition refractory material to be used in preparing the module of this invention are described, for example, in U.S. Pat. Nos. 2,866,466; 3,024,145; 3,224,927; 3,311,585; 2,329,589; 2,995,453; 3,041,205 and the like. Additional refractory materials and processes for their production are also disclosed in U.S. Pat. Nos. 2,208,571; 2,380,945; 2,603,570; 2,662,022; 2,839,416; 2,949,375; 3,102,037; 3,138,471; 3,178,299; 3,445,257 and the like.

One particularly preferred refractory for monoliths with higheer compressive strengths is made by admixing a refractory powder and inorganic binder precursor with $SiO_2$, $Al_2O_3$, $TiO_2$ or $ZrO_2$, a small and controlled amount of a gelling agent and optionally a diluent to form a refractory mixture, gelling the resulting mixture slowly, generally within a period of from 0.5 hours to 3 days, preferably from within 1 hour to 3 hours, under controlled conditions and thereafter curing and drying the gelled refractory. Sodium or potassium silicate is preferably used as a binder precursor although organic silicates, zirconates, titanates, and the like may also be employed. As the refractory powder it is preferred that powders such as alumina, α-alumina, silicon, carbide, zircon, zirconia, magnesia, chromia, titania, silica and combinations thereof as well as refractory borides, nitrides, silicides and carbides of various metals such as aluminum, chromium, zirconium tungsten, molybdenum, titanium and the like be employed. Metal powders such as aluminum metal produced by a hammermill process may also be used. The gelling agent is any material that will cause the binder precursor to gel prior to drying such as, for example, sodium fluorosilicate, potassium fluorosilicate, organic esters and the like which undergo controlled rates of hydrolysis with the proper conditions of solubility, acidity, and/or heat.

Any desired diluent may be added to the reaction mixture in order to assist in controlling such factors as wetting, viscosity, dry strength and so on. Examples of some such suitable diluents include, for example, aqueous solutions of carboxymethyl cellulose, aqueous solutions of sodium carboxymethyl cellulose, agar, detergents and aqueous solutions of "Kelzan." "Kelzan" is a colloidal polymer prepared by the fermentation of a medium by the bacterium Xanthomanas compestris as described in U.S. Pat. No. 3,067,038.

Refractory materials made as described above are distinguished by having a modulus of transverse rupture strength in excess of 1000 psi, usually in excess of 1250 psi. A further advantage of these materials is that dimensional changes during gelling are controlled or eliminated and shrinkage usually encountered in the prior art binding and drying of conventional refractory materials is substantially eliminated. Refractory bodies made using such formulations shrink less than 2.0 percent in any dimension during gellation and generally less than 1 percent. This property permits fabrication of complex three-dimensional structures such as the modules of this invention which are stable during preparation and exposure to elevated temperature, moisture and other usually adverse conditions encountered in the production of refractories and the treatment of fluids.

In choosing the refractory transition material to be used in preparing the module, it is only necessary to keep in mind the fact that the strength of the transition refractory material must be sufficient to secure the monolith within the casing or housing of the module, but weak enough so that the compressive strength of the monolith measured perpendicular to its weakest longitudinal axis or, in other words, in the direction of transverse axis 13 depicted in FIG. 2, is greater than the compressive strength of the transition refractory material. This criticality must be observed since the monolith itself will rupture along its perimeter and fracture out of the construction if the strength of the cement or transition refractory material is greater than the strength of the monolith. However, the transition refractory material must be strong enough to resist erosion or attrition under operating or treating conditions while adequately supporting the monolith within the exterior housing. When these two conditions of strength of the refractory cement cannot be met with a specific monolith, a stronger monolith should be chosen to permit the use of a stronger cement or a casing modified to permit formation of a stronger bond should be used.

In this regard, it must be kept in mind that each monolith or unitary catalyst element has a different compression or crush strength depending on the axis across which the crush strength is measured and the configuration of the monolith. Thus, a transition refractory material or cement which cannot function adequately for one type monolith may be capable of functioning excellently when a different kind of monolith is used. In order to determine whether a chosen refractory will function in the context of the instant invention one need only measure the compressive strength of the contemplated refractory and the compressive or crush strength of the monolith. The crush strength must be determined in the direction in which the cement of the module is to work on the monolith. The crush or compessive strength of the monolith and of the cement may be determined by any suitable method including simply using a press in which pressure is applied to the monolith or a bar of the transition refractory material until it fails. Any standard test may be used as, for example, ASTM test C-133-55. The compressive or crush strength of the cement should not exceed about 98 percent of the lowest compressive or crush strength of the monolith as measured perpendicular to a longitudinal axis of the ceramic unitary element.

The module of this invention as illustrated in FIG. 3 can be prepared by any suitable method. No dimensional matching is required between the monolith and the casing since the transition refractory material acts as a cement and is capable of occupying any irregular space between the monolith and the casing. Thus, the monolith or monoliths may be dropped into a cylinder containing a series of perforations, which cylinder is then passed through a machine that squeezes the refractory cement formulation through the perforations and wipes any excess cement from the casing. Alternatively, the monolith may be coated with the refractory cement formulation and simply squeezed into the casing or metal or wire may be wrapped around a monolith or monoliths coated with the cement formulation and then sealed or the interior of the casing may be coated with the refractory formulation and the monolith squeezed into the cylinder or any other method may be employed as dictated by available equipment and the exigencies of the occasion.

The modules of this invention are useful in any application in which a monolith alone is used whether or not it is coated with a catalyst. Because of the integrity of the module of this invention, it is capable of being readily and efficiently used in a mass production assembly line operation without any of the disadvantages and the time consuming techniques which had been necessitated heretofore in the handling of the fragile monolith structure per se. Thus, the unitary physical structures of similar or dissimilar materials of construction or modules of this invention are important, for example, in the treatment of emissions from internal combustion engines. Even under those circumstances in which the monolith is not to be utilized as a support for a catalyst, the module of this invention can be employed with equivalent and ever superior result.

The invention is further illustrated by the following examples in which all parts and percentages are by weight unless otherwise specified.

EXAMPLE 1

A. A piece of 18 gauge stainless steel perforated with

⅛ inch metal span between adjacent ⅛ inch diameter holes was rolled and welded to form a 2 and ⅝ inch inside diameter tube. This tube was cut into 1.5 inch lengths.

B. Two 1 inch square cubes were cut from each of several 12 inches by 12 inches by 1 inch slabs of mullite ceramic honeycomb prepared as described in Example 1 of U.S. Pat. No. 3,473,987. Using an Instron (Model No. TTCMI) testing unit, the average compressive strength in the direction perpendicular to each of the two longitudinal axes (one in the direction of the ribbing and one perpendicular to the direction of the ribbing) was found to be 1845 psi and 2230 psi, respectively.

C. A refractory cement was prepared by blending 50 g. of alpha alumina (minus-325 U.S. Std. Sieve), 0.75 g. of sodium silicofluoride, 15 g. of sodium silicate (Du Pont F grade) and about 5.5 ml of water. The mixture was shaped into a 1-inch cube and permitted to dry and cure during 60 hours after which it was then heated to 450°C. for 4 hours. the compressive The was determined to be 2550 psi.

D. A mixture of 45 g. of alpha alumina, 5 g. of alumina monohydrate powder and 1 g. of sodium silicofluoride was blended with 20 g. of sodium silicate and about 7.2 ml of water. The mixture was formed into a 1-inch cube, dried and cured during 58 hours and then heated at 450°C. for 4 hours. The compressive strength was determined to be 1790 psi.

E. Four 1.0 inch long, 2.5 inch diameter discs were cut from cylindrical slabs of the ceramic honeycomb described in B. The circumference of each disc was coated with the cement described in C and inserted into the cylinder described in A. Additional cement was used to fill the perforations in the cylinder which did not fill with cement upon insertion of the ceramic honeycomb into the cylinder. The modular constructions were dried and cured during 60 hours, then heated to 450°C. for 4 hours. It was noted that the face of the ceramic honeycomb in one of the rings had cracked during the heating and an 0.5 cm diameter piece had spalled from this surface. The remaining 3 pieces appeared to be in good condition.

F. Four 1.0 inch long, 2.5 inch diameter discs were cut from cylindrical slabs of the ceramic honeycomb described in B. These were cemented as described in E into the rings described in A using the cement described in D. The modules were dried and cured during 60 hours, then heated to 450°C. during 4 hours. All of the pieces were in good condition.

G. A 350 cubic inch displacement 8 cylinder V8 engine mounted on an engine stand was fitted with separate carburetors on each bank of cylinders. The engine was run alternately on each carburetor for 15 minute intervals, so that one side of the engine was always operating normally while the other side was pumping cold air.

Two each of the completed constructions described in E and F were placed in a metal cannister attached to the manifold on each bank of the engine in such a fashion that the gases pass through it. The engine was operated on an alternating 15 minute cycle for a total period of 290 hours. A thermocouple in each of the manifolds indicated an average temperature of 670°C. on the side in normal operation and a temperature of 125°C. for the alternate side which was pumping air.

At the end of 290 hours, all of the rings were removed for inspection. All of the rings described in E showed physical damage of the ceramic honeycomb. The module that had cracked initially during oven heating had lost additional material which increased the size of the crack. One other module had developed a crack and lost material by spalling of the honeycomb surface. The two remaining modules showed extensive crack formation near the cement-honeycomb interface.

All of the modules described in F were intact and had not changed in appearance.

EXAMPLE 2

A 1-inch cube was cut from a 1-inch thick slab of "Cercor" honeycomb (Corning Glass Works, Corning, N.Y.). The compressive strength in the direction perpendicular to the weakest longitudinal axis was found to be 890 psi.

Four parts of a porcelain cement (Sauereisen Cement Co., Pittsburgh, Pa., No. 1. paste) were blended with 1 part of silica flour and wetted with Sauereisen thinner No. 14 to yield a formable mixture which was shaped into a ¼ inch cube. The cube was dried for 5 days and heated to 65°C. for 1 day. It was determined to have a compressive strength of 875 psi.

Two 1.0 inch long, 2.5 inch diameter discs were cut from a cylinder of "Cercor." Each was cemented with the above cement into a ring prepared as described in Example 1A using the procedure described in Example 1E. The resulting modules were dried for 5 days and heated to 65°C. for 1 day. Each module was mounted in a cannister on opposite sides of an internal combustion engine as described in Example 1G and run through 100 cycles under conditions such that the temperature of the hot gases was about 460°C. and the temperature of the cold gases was about 100°C. The units were then removed and found to be unaltered by the test exposure.

EXAMPLE 3

The module described in Example 2 was prepared except that the cement described in Example 1D was used.

When tested as described in Example 2, the module failed inasmuch as a crack or separation of the honeycomb occurred in the honeycomb structure at the honeycomb-cement interface.

EXAMPLE 4

A. A metal (lath) wire cloth was rolled and welded to form a cylinder having a 3 inch inside diameter.

B. A honeycomb having triangular shaped cells (American Lava Corp., Chattanooga, Tenn., "Alsimag 795") was cut to 1-inch cubes and found to have an average compressive strength perpendicular to the weakest longitudinal axis of 515 psi.

C. An air setting refractory cement (A. P. Green Refractories Co., Pueblo, Colo.) was mixed with water to yield a paste which was formed into a 1-inch cube. The cube was dried for 3 days and heated to 200°C. for 8 hours. It had a compressive strength of 500 psi.

D. Three 2.85 inch diameter by 1-inch thick discs were cut from the honeycomb described in B. These were all cemented into a 3.5 inch length of the cylinder described in A using the cement described in B and the procedure described in Example 1E.

Figure 4:
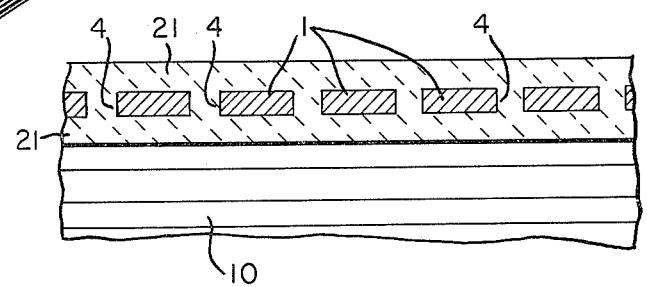
FIG. 4 is a fragmentary section of a modular structure in which the casing or housing surrounds and is embedded in the transition refractory material.

This unit was tested as described in Example 2. While the ceramic components appeared to be in their original condition after 100 cycles, the metal lath screen appeared to have undergone some superficial oxidation. This latter condition can be reduced or obviated by imbedding the metal screen in the outer layer of the cement as depicted in FIG. 4.

EXAMPLE 5

Four samples were prepared as described in Example 1F except that the ceramic honeycomb discs were coated with 10 percent by weight of a catalyst to yield an element containing 3 percent of platinum on activated (gamma) alumina. The procedure used to apply the catalyst is described in Example 3 of U.S. Pat. No. 3,554,929. All four discs were stacked and cemented as described in Example 1E to form a single monolith within a 4.5 inch long perforated metal cylinder described in Example A.

This unit was tested as described in Example 1G for 372 hours using an Indolene clear fuel for the engine. During this period there was a varying but positive temperature increase in the gases passing through the catalyst, indicating that it was functioning. At the end of the test run, no physical damage to the structure was observed; however, the color of the catalyst has changed from dark gray to a lighter brownish gray tint. While some loss of some of the cement from several of the metal perforations was observed, the module functioned adequately and could continue to do so. The choice of a stronger monolith which would allow the use of a correspondingly stronger cement would obviate the loss noted in this example.

EXAMPLE 6

A sample of a ceramic open-cell isotropic foam obtained from Plessey, Ltd., (Hightown, N.J.) containing approximately 20 cells per lineal inch and having an open area of about 90 percent was found to have a compressive strength of 145 psi.

A 1/16 inch thick polytetrafluoroethylene 2 inch diameter cylinder with 1/16 inch wide slots, ½ inch long and spaced 1/16 inch apart was prepared. A 1.86 inch diameter disc of the ceramic foam was cemented into the cylinder as described in Example 1E using "Fiberfrax" a ceramic refractory fibrous material of the Carborundum Company, wetted with 23.7 percent of colloidal silica based on the weight of the "Fiberfrax." A dried sample of this cement had a compressive strength of 124 psi.

The unit was subjected to dust laden gas flow at about 0b C. for 75 hours. The module was in excellent physical condition after this exposure, despite the fact that it had undergone a 14 percent weight increase due to the weight of the dust particles filtered from the hot gases.

It is to be understood that any of the components and conditions mentioned herein may be substituted for its counterpart in the foregoing examples and that although the invention has been described in considerable detail in the foregoing, such detail is solely for the purpose of illustration. Variations can be made by those skilled in the art without departing from the spirit and scope of the invention except as set forth in the claims.

What is claimed is:

1. A module which comprises a casing having an inlet and an outlet face and an interior and exterior surface, said interior surface of the casing having some physical or mechanical means to which a rigid transition refractory cement can be anchored, a monolith within said casing and having at least one longitudinal and transverse axis, which monolith allows substantially unobstructed flow between the inlet and outlet faces of the casing, a rigid transition refractory cement anchored to the interior surface of the casing and to the outer periphery of the monolith, the materials of construction of said monolith and said rigid transition refractory cement being such that the lowest compressive strength of the monolith measured perpendicular to a longitudinal axis being greater than the compressive strength of the transition refractory cement.

2. The module of claim 1 wherein the casing is cylindrical.

3. The module of claim 1 wherein the monolith has a honeycomb skeletal structure.

4. The module of claim 1 wherein the monolith is coated with a catalyst for the treatment of a fluid.

5. The module of claim 1 wherein the transition refractory cement is a conjunctive cement based on soluble silicates.

6. The module of claim 1 wherein the compressive strength of the transition refractory cement does not exceed 98% of the lowest compressive strength of the monolith measured perpendicular to a longitudinal axis of the monolith.

7. The module of claim 1 wherein the interior surface of the casing is irregular or textured.

8. The module of claim 1 wherein the transition refractory cement has a transverse rupture strength in excess of 1000 psi.

9. The module of claim 1 wherein the casing is a lath wire mesh and the cement surrounds the exterior surface of the casing in addition to the interior surface.

10. The module of claim 1 wherein the casing is metal.

11. The module of claim 10 wherein the metal is stainless steel.

12. The module of claim 1 wherein the casing contains perforations.

13. The module of claim 12 wherein the transition refractory cement protrudes beyond the casing through the perforations, and surrounds the exterior surface of the casing in addition to the interior surface.

* * * * *